United States Patent
Yoon

(10) Patent No.: US 11,358,718 B2
(45) Date of Patent: Jun. 14, 2022

(54) LOW-ALTITUDE UNMANNED AERIAL VEHICLE SURVEILLANCE SYSTEM

(71) Applicant: Sung Wook Yoon, Seoul (KR)

(72) Inventor: Sung Wook Yoon, Seoul (KR)

(73) Assignees: Seung Hee Choi, Seoul (KR); Yong Woo Lee, Gyeonggi-do (KR)

( * ) Notice: Subject to any disclaimer, the term of this patent is extended or adjusted under 35 U.S.C. 154(b) by 380 days.

(21) Appl. No.: 16/440,909

(22) Filed: Jun. 13, 2019

(65) Prior Publication Data

US 2020/0062392 A1 Feb. 27, 2020

(30) Foreign Application Priority Data

Aug. 21, 2018 (KR) .................. 10-2018-0097383
May 7, 2019 (KR) .................. 10-2019-0053158

(51) Int. Cl.
| | |
|---|---|
| B64C 39/02 | (2006.01) |
| B64B 1/50 | (2006.01) |
| B64D 47/08 | (2006.01) |
| G05D 1/00 | (2006.01) |
| G01S 13/86 | (2006.01) |

(Continued)

(52) U.S. Cl.
CPC .............. *B64C 39/024* (2013.01); *B64B 1/50* (2013.01); *B64D 47/08* (2013.01); *G01S 13/867* (2013.01); *G01S 19/015* (2013.01); *G05D 1/0011* (2013.01); *H04K 3/825* (2013.01); *H04K 3/90* (2013.01); *B64C 2201/022* (2013.01); *B64C 2201/101* (2013.01); *B64C 2201/127* (2013.01); *B64C 2201/22* (2013.01); *H04K 2203/22* (2013.01)

(58) Field of Classification Search
CPC ........................ B64C 39/024; G01S 13/867
See application file for complete search history.

(56) References Cited

U.S. PATENT DOCUMENTS 5,115,997 A * 5/1992 Peterson ................... B64B 1/20
244/33
9,081,651 B2 * 7/2015 Filev ...................... B60K 31/00
9,800,091 B2 * 10/2017 Nugent, Jr. ............... B64F 3/02
(Continued)

FOREIGN PATENT DOCUMENTS

CN 101830341 A * 9/2010
CN 203439271 U * 2/2014
(Continued)

OTHER PUBLICATIONS

First Office Action dated Sep. 30, 2020 for Chinese Patent Application 201910519304.1.
(Continued)

*Primary Examiner* — Shelley Chen
(74) *Attorney, Agent, or Firm* — Farjami & Farjami LLP

(57) ABSTRACT

Disclosed is a low-altitude unmanned aerial vehicle surveillance system. According to an embodiment, monitoring is performed using a balloon main body filled with gas and staying in the air; radar; camera units being provided outside the balloon main body, and including a camera taking an image of a subject; radio frequency detectors; and sound detectors and correspondingly, interceptor means is included. As interceptor means, a jammer, a jamming gun, and a spoofing device corresponding to jamming are disclosed.

13 Claims, 5 Drawing Sheets

(51) Int. Cl.
*G01S 19/01* (2010.01)
*H04K 3/00* (2006.01)

(56) References Cited

U.S. PATENT DOCUMENTS

| | | | |
|---|---|---|---|
| 10,168,695 B2* | 1/2019 | Barnickel | G05D 1/0033 |
| 10,340,983 B2* | 7/2019 | Liu | H04B 3/21 |
| 10,384,777 B1* | 8/2019 | Welsh | B64F 3/02 |
| 10,435,152 B1* | 10/2019 | Cook | H01B 7/043 |
| 10,457,269 B2* | 10/2019 | Sugiyama | B60W 20/20 |
| 10,475,239 B1* | 11/2019 | Priest | B64C 39/024 |
| 10,507,914 B2* | 12/2019 | Walker | B64D 47/08 |
| 10,560,666 B2* | 2/2020 | Chandra | G06K 9/3208 |
| 10,904,807 B2* | 1/2021 | Kaneda | H04W 36/03 |
| 10,948,919 B2* | 3/2021 | Zhu | G05D 1/0238 |
| 10,994,842 B1* | 5/2021 | Skylus | B64D 1/08 |
| 2006/0214053 A1* | 9/2006 | Hase | B64B 1/50 244/33 |
| 2009/0259355 A1* | 10/2009 | Li | B60W 50/0097 701/22 |
| 2013/0062457 A1* | 3/2013 | Deakin | B64B 1/38 343/706 |
| 2013/0261889 A1* | 10/2013 | Sekine | B60W 50/085 701/36 |
| 2014/0277835 A1* | 9/2014 | Filev | G06F 17/00 701/2 |
| 2015/0120107 A1* | 4/2015 | Yu | B60W 20/00 701/22 |
| 2016/0068264 A1* | 3/2016 | Ganesh | G05D 1/0676 701/2 |
| 2016/0117931 A1* | 4/2016 | Chan | G08G 5/0034 701/120 |
| 2016/0225264 A1* | 8/2016 | Taveira | G08G 5/0013 |
| 2016/0297521 A1* | 10/2016 | Cheatham, III | G06Q 20/145 |
| 2016/0364004 A1* | 12/2016 | Ekandem | G06K 9/00355 |
| 2016/0364989 A1* | 12/2016 | Speasl | G08G 5/0082 |
| 2017/0043271 A1* | 2/2017 | Halliburton | A63H 27/10 |
| 2017/0069214 A1* | 3/2017 | Dupray | G08G 5/0021 |
| 2017/0238234 A1* | 8/2017 | Dowlatkhah | H04W 48/20 455/517 |
| 2018/0002010 A1* | 1/2018 | Bauer | B64C 39/024 |
| 2018/0069650 A1* | 3/2018 | Tran | G01S 19/015 |
| 2018/0194466 A1* | 7/2018 | Zhao | G05D 1/102 |
| 2018/0251216 A1* | 9/2018 | Whitaker | B64C 39/024 |
| 2018/0330624 A1* | 11/2018 | Gong | G08G 5/0069 |
| 2019/0011934 A1* | 1/2019 | DeBitetto | G05D 1/106 |
| 2019/0023394 A1* | 1/2019 | Ranaivoson | B64C 39/022 |
| 2019/0088156 A1* | 3/2019 | Choi | G05D 1/0038 |
| 2019/0206267 A1* | 7/2019 | Taveira | G08G 5/003 |
| 2019/0283871 A1* | 9/2019 | Wieczorek | B64C 27/08 |
| 2020/0171962 A1* | 6/2020 | Han | B60W 10/08 |
| 2020/0406894 A1* | 12/2020 | Akella | G01S 13/865 |
| 2021/0192629 A1* | 6/2021 | Tofte | G06T 11/60 |
| 2021/0240206 A1* | 8/2021 | Michini | G01C 11/02 |
| 2021/0255356 A1* | 8/2021 | Vu | G01V 11/00 |

FOREIGN PATENT DOCUMENTS

| | | | | |
|---|---|---|---|---|
| CN | 203439271 U | | 2/2014 | |
| CN | 107566078 A | * | 1/2018 | |
| CN | 107566078 A | | 1/2018 | |
| CN | 107607965 A | | 1/2018 | |
| CN | 107685846 A | * | 2/2018 | |
| DE | 10130722 A1 | * | 4/2003 | B64B 1/50 |
| EP | 3168133 A1 | * | 5/2017 | B64C 1/062 |
| KR | 10-2012-7018957 | | 10/2012 | |
| KR | 2017025386 A | * | 3/2017 | A62C 3/0242 |
| KR | 10-2017-0025386 A | | 5/2017 | |
| KR | 10-1748305 B | | 6/2017 | |
| KR | 101748305 B1 | * | 6/2017 | |
| KR | 10-2018-0019462 A | | 2/2018 | |
| KR | 10-2018-0091531 A | | 2/2019 | |

OTHER PUBLICATIONS

Second Office Action dated Apr. 26, 2021 for Chinese Patent Application 201910519304.1.
Decision on Rejection dated Dec. 30, 2021 for Chinese Patent Application 201910519304.1.
Office Action dated Jun. 9, 2020 for Korean Patent Application 10-2019-0053158.
Decision of Refusal dated Nov. 26, 2020 for Korean Patent Application 10-2019-0053158.
Yunmok Son, Hocheol Shin, Dongkwan Kim, Youngseok Park, Juhwan Noh, Kibum Choi, Jungwoo Choi and Yongdae Kim "Rocking Drones with International Sound Noise on Gyroscopic Sensors" 24th USENIX Security Symposium, Aug. 12-14, 2015 pp. 1-16.

* cited by examiner

[Fig. 1]
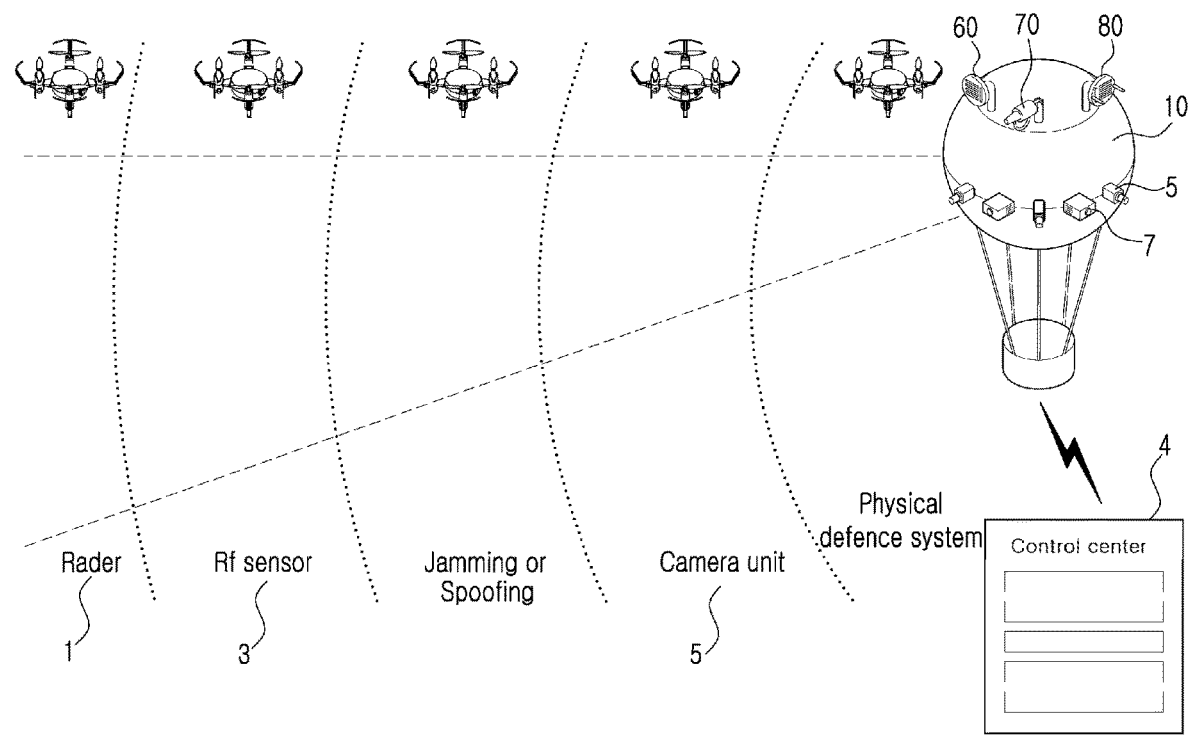

[Fig. 2]
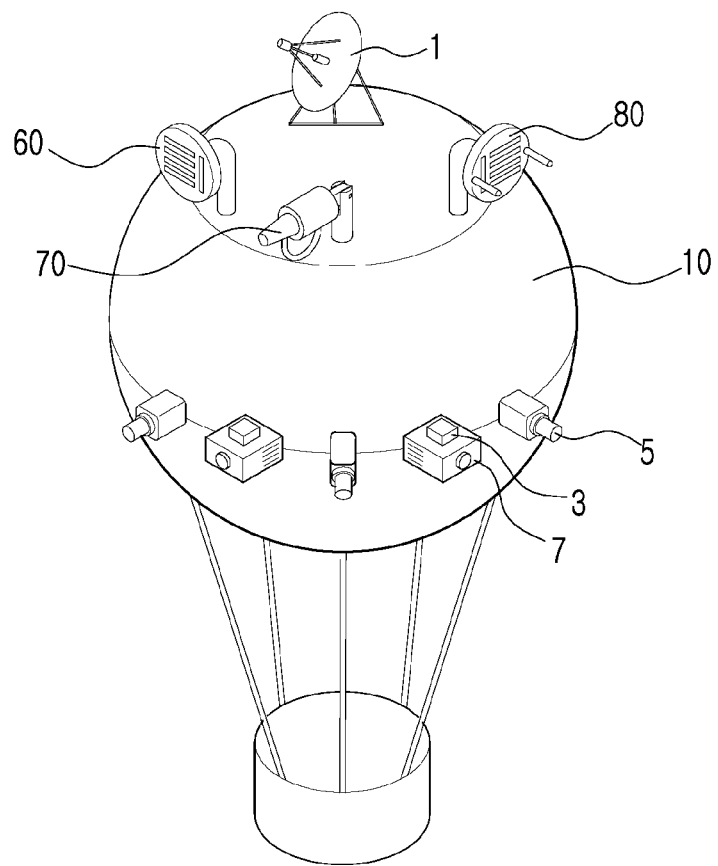

[Fig. 3]
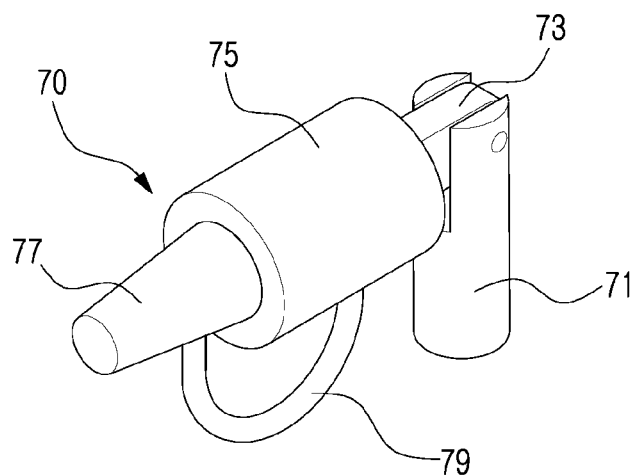
[Fig. 4]
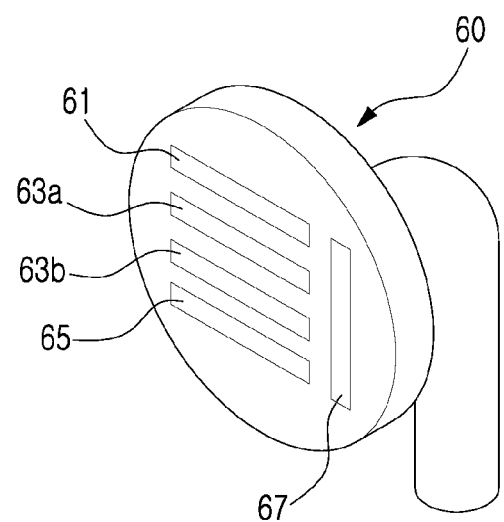

[Fig. 5]
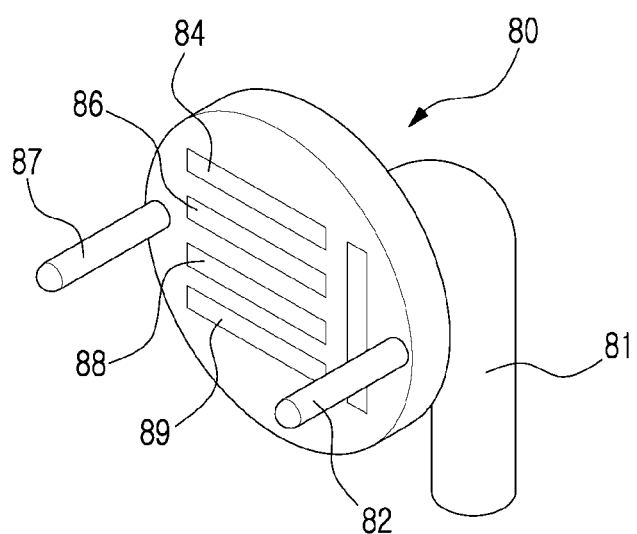

[Fig. 6]
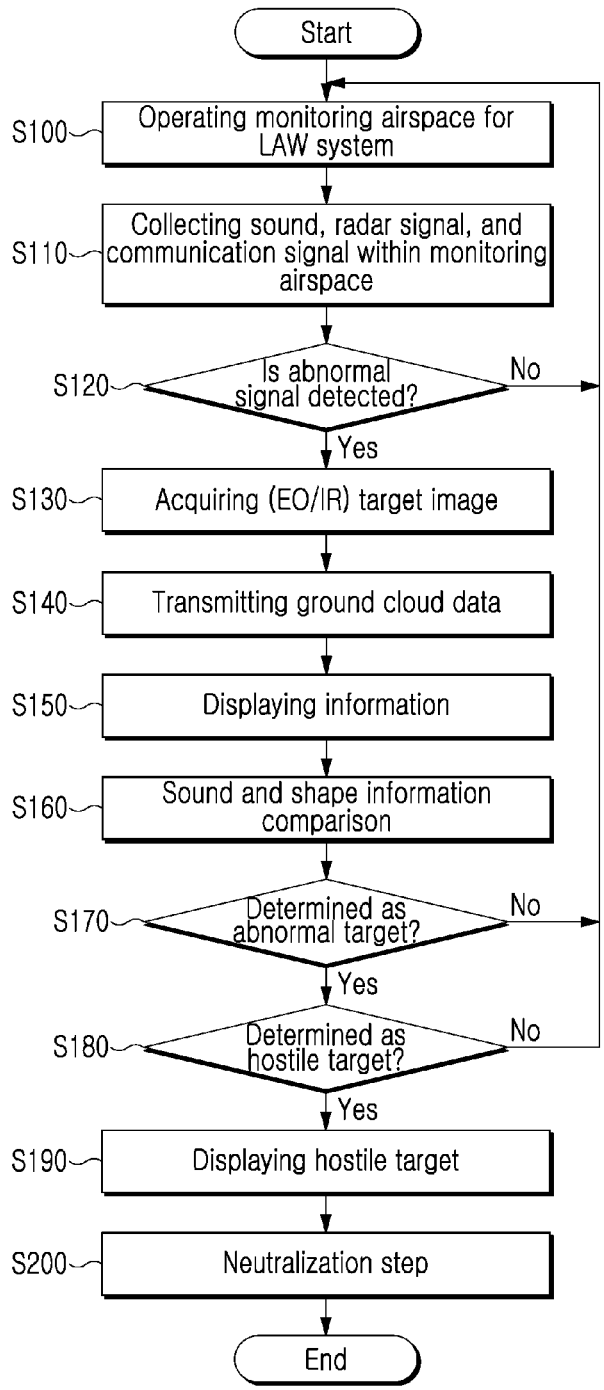

LOW-ALTITUDE UNMANNED AERIAL VEHICLE SURVEILLANCE SYSTEM

CROSS REFERENCE TO RELATED APPLICATION

This application is based on and claims priority from Korean Patent Applications Nos. 10-2018-0097383 filed on Aug. 21, 2018 and 10-2019-0053158 filed on May 7, 2019 in the Korean Intellectual Property Office, the disclosure of which is incorporated herein in its entirety by reference.

BACKGROUND OF THE INVENTION

Field of the Invention

The present invention relates generally to a low-altitude unmanned aerial vehicle surveillance system. More particularly, the present invention relates to a low-altitude unmanned aerial vehicle surveillance system, in which it is possible to improve low-altitude aircraft detection capability with low cost and high efficiency.

Description of the Related Art

Unless otherwise indicated herein, the contents set forth in this section are not prior art to the claims of this application and are not to be construed as being prior art to be included in this section.

The future wars are undergoing a new phase of change due to the innovative development of science and technology. In particular, the rapid development of communication and network systems, along with the rapid development of IT, software, and media technologies, has led to the need for high-level detection capability to ensure real-time decision-response.

With the development of scientific technology, the threat of North Korea has been diversified recently. North Korea is constantly causing low-intensity conflicts with new forms of irregular warfare such as attempts to conduct surveillance by small unmanned aerial vehicles (UAVs) and cyber terrorism, as well as asymmetric threats such as the development of nuclear weapons and ballistic missile launch tests.

In such a future battleground environment, the role of the unmanned weapon system that can carry out dangerous missions and minimize the loss of human lives will increase.

Especially, it is anticipated that three-dimensional warfare, where manned and unmanned systems are integrated, will be developed utilizing the low-altitude airspace (equal to or less than 20,000 ft) in which spatial movement is relatively free, such as launching low-altitude penetration and surveillance/reconnaissance activities by small UAVs.

UAVs vary in size and operating area from ultra-small UAVs that are about 15 cm in size and can be maneuvered by hand to large UAVs that can be operated at altitudes of over 45,000 ft.

As the application range and application fields in the private sector become wider, demand has increased and thus various types of UAV have been developed, and civilians can easily operate UAVs. As a result, the possibility of terrorism using an UAV has also increased.

In addition, recently released hoverbike technology can easily allow access to major facilities by an unspecified number of people, thereby increasing the possibility of sporadic terrorism such as small bombs and IED terrorism.

In Korea, more than 70% of the country is a mountainous region, and particularly, most of the front areas bordering North Korea are rugged mountainous areas with high peaks.

This means that the above ground level (AGL) is also very irregular depending on the terrain, which is highly likely to degrade the detection capability due to terrain masking when operating ground-based low altitude acquisition radar.

Therefore, in order to overcome this, it is required to operate an effective surveillance/detection system other than the ground-based radars, which can detect infiltrating aircrafts in low-altitude tactical flight.

Especially in the downtown areas of Seoul and Gyeonggi-do, many high-rise buildings are concentrated.

In addition, the increase in population activity in the region causes high atmospheric heat, and the reliability of ground-based radar operation is likely to be decreased due to increased diffuse reflection.

Even in the process detecting/tracking a low-altitude aircraft, the ground-based radar may be affected by multipath interference, resulting in decrease in accuracy, and the error signal in the high-angle direction is increased, making it difficult to obtain stable tracking data.

Therefore, it is required to operate a new level of detection system that can overcome the disadvantages of radar based detection system.

However, due to lack of surveillance and detection capability for small UAVs, a new level of protection capability is required for major facilities such as national key facilities.

To detect UAVs in low-altitude airspace, which is a significant threat, it is common to operate low-altitude detection radar.

However, it is difficult to overcome the limitations due to terrain masking in mountainous terrain and urban areas, and workability such as detection range and accuracy is insufficient.

In order to compensate for this, there is provided early warning capability by detecting/tracking low-altitude infiltration targets even in the mountainous terrain, and there is an effort to enable real-time battlefield surveillance in conjunction with an automation system. However, it is still in development stage and has not proven to be effective.

In order to compensate for the blind spot of low-altitude radar since the invasion of North Korean UAV, the military has considered ways to reinforce surveillance equipment such as a thermal observation device (TOD) and a multi-functional observation device, and to supplement visual surveillance by security guards.

However, it is difficult to observe objects at altitude of 300 m or more by visual observation. According to published data, it is known that a North Korean UAV infiltrated into Korean airspace at an altitude of 1 to 2 km. Accordingly, the visual surveillance on the ground is limited in preventing North Korean UAVs.

Also, there is a disadvantage that the interceptor means for low-altitude UAVs is limited.

For successful interception, tracking while scan (TWS) is essential, but low RCS of the small UAV makes TWS difficult.

Thus, limited countermeasures such as the configuration of a fire net using an existing Vulcan cannon have been suggested, and the equipment such as a laser weapon known to be capable of precise interception causes a problem that the cost effectiveness is too low.

There are also a number of limitations on the hard-kill countermeasures against UAVs in urban areas due to concerns about secondary damage.

A provocation using a UAV can be highly effective at low cost, which is a very attractive means to North Korea.

The military's current countermeasures against this are very ineffective and the cost effectiveness thereof is also low.

To overcome this, a low-cast and high-efficiency countermeasure against low-altitude UAVs needs to be proposed.

The foregoing is intended merely to aid in the understanding of the background of the present invention, and is not intended to mean that the present invention falls within the purview of the related art that is already known to those skilled in the art.

Document of Related Art (Patent Document 1) Korean Patent Application No. 10-2012-7018957

SUMMARY OF THE INVENTION

Accordingly, the present invention has been made keeping in mind the above problems occurring in the related art, and the present invention is intended to propose a low-altitude unmanned aerial vehicle surveillance system, the system being capable of enhancing detection capability by a sensor staying in the air and performing a role of an air surveillance system at a low altitude efficient in detecting small unmanned aerial vehicles.

In order to achieve the above object, according to one aspect of the present invention, there is provided a low-altitude unmanned aerial vehicle surveillance system including: a balloon main body filled with gas and staying in air; a rope connected to the balloon main body and fixed to ground; a camera units being provided outside the balloon main body, and including a camera taking an image of a subject; an image transmission part included in the camera units, and mounted to the balloon main body to transmit an image; and an external remote control device including a monitor receiving an image signal transmitted from the image transmission part for display, and a data storage part storing the image signal.

The external remote control device may include a control part remotely controlling the camera unit.

The camera units may include a position tracking device in such a manner that the camera takes an image of an aircraft while tracking the aircraft, and may also include a heat sensing device.

The balloon main body may be formed in a donut shape with a through-hole such that wind passes therethrough, wherein a wind power generator may be provided in the through-hole.

The wind power generator may include: a wind turbine mounted to the balloon main body; a generator generating electricity by receiving torque of the wind turbine; and a power storage part storing the generated electricity.

The balloon main body may be provided with radar, radio communication sensors, an electro-optical device (EO), and an infrared sensor (IR) to find an aircraft, and may be provided with a sound detector to detect aircraft noise (motor sound, and the like), wherein the model of the aircraft may be identified by being connected to the sound detector to analyze a frequency of the aircraft noise.

When an aircraft is detected using the radar and the radio communication sensor, an abnormal signal is transmitted. When the abnormal signal is received, the camera units provided with the electro-optical device (EO) and the infrared sensor (IR) is used to observe the aircraft. Information from the camera units and the frequency of the aircraft noise are analyzed by being connected to the sound detector so as to identify the model of the aircraft. When the unmanned aerial vehicle is detected as a hostile target, the balloon main body is provided with aerial vehicle interceptor means.

Further, a transport vehicle may be provided to load the balloon main body and transport the same to a desired location, and the transport vehicle may be provided with a gas injection device configured to fill the inside of the balloon main body with gas to provide buoyancy.

According to the embodiment, since the airspace can be monitored from an external remote control device on the ground by floating a plurality of balloon main bodies in the air, it is possible to perform a role of an air surveillance system at a low altitude efficient in detecting small unmanned aerial vehicles.

Effects that may be obtained from the present invention will not be limited to only the above described effects. In addition, other effects which are not described herein will become apparent to those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a conceptual diagram illustrating schematic operation of a low-altitude unmanned aerial vehicle surveillance system according to an embodiment;

FIG. 2 is a perspective view illustrating a balloon main body in a low-altitude unmanned aerial vehicle surveillance system according to an embodiment of the disclosure;

FIG. 3 is a perspective view illustrating in detail a jamming gun of a balloon main body in a low-altitude unmanned aerial vehicle surveillance system according to an embodiment of the present invention;

FIG. 4 is a perspective view illustrating in detail a jammer of a balloon main body in a low-altitude unmanned aerial vehicle surveillance system according to an embodiment;

FIG. 5 is a perspective view illustrating in detail a GPS spoofing device of a balloon main body in a low-altitude unmanned aerial vehicle surveillance system according to an embodiment; and FIG. 6 is a flowchart illustrating operation of a low-altitude unmanned aerial vehicle surveillance system according to an embodiment.

DETAILED DESCRIPTION OF THE INVENTION

Hereinbelow, exemplary embodiments of the present invention will be described in detail with reference to the accompanying drawings.

The terminology used herein is for the purpose of describing particular aspects (or embodiments) only and is not intended to be limiting of the present invention. As used herein, the singular forms are intended to include the plural forms as well, unless the context clearly indicates otherwise.

Also, in the figures, sizes or shape may be exaggerated to be large, for clarity of illustration and for convenience. Further, the terms described below are defined considering configurations and operations in the embodiments of the present invention, which may vary depending on the intention of the user, the operator, or the custom. Therefore, the definition of the terms should be based on the contents throughout this specification.

Also, an embodiment to be described below discloses a low-altitude unmanned aerial vehicle surveillance system according to a preferred embodiment with respect to the accompanying drawings. It is noted that each element shown in the drawings is omitted or schematically drawn for convenience and clarity. Therefore, the size of each element may not fully reflect an actual size. Also, throughout the whole specification, the same reference numerals denote the same elements. In the individual drawings, reference numerals for the same elements will be omitted.

FIG. 1 is a conceptual diagram illustrating schematic operation of a low-altitude unmanned aerial vehicle surveillance system according to an embodiment.

As shown in FIG. 1, in a low-altitude unmanned aerial vehicle surveillance system according to an embodiment of the disclosure, radar 1, a radio frequency sensor 3, an electro-optical device (EO), an infrared sensor (IR), and a sound detector 7 operate in a complementary manner to monitor a low-altitude unmanned aerial vehicle. As the result of monitoring, when the low-altitude unmanned aerial vehicle is determined as the enemy, coping takes place using appropriate interceptor means according to a distance between the low-altitude unmanned aerial vehicle and a balloon main body 10.

In the case of the radar 1, sensing at an angle of 10° and a long distance within 1.1 km is possible, but due to the characteristic of the radar 1, there is a problem that detection rate sharply decreases as approaching closely, maximum detection height is not high, and the blind spot is wide. However, the radar has an advantage of being strong against jamming and interference.

In the case of the radio frequency sensor 3, sensing at an angle of 360° and a distance within 1 km is possible. There is an advantage in that the signals of the low-altitude unmanned aerial vehicle and of a control stick are signals of a radio frequency band and a radio frequency signal which the low-altitude unmanned aerial vehicle transmits is detected in real time to establish a defense system. Also, there are advantages in that signals of a drone and the control stick are composed of radio frequencies so a position of an operator is estimated and in that terrorism by the low-altitude unmanned aerial vehicle is prevented immediately after the low-altitude unmanned aerial vehicle has taken off by sensing a radio frequency signal for taking action when the low-altitude unmanned aerial vehicle has taken off.

When the low-altitude unmanned aerial vehicle breaks through a radio frequency detection area, an electro-optical device (EO), an infrared sensor (IR), a heat sensing device, and a position tracking device that are included in a camera unit 5, and the sound detector 7 are used to take action against the low-altitude unmanned aerial vehicle. The system comprises at least one camera unit, preferably a plurality of camera units.

An image of the low-altitude unmanned aerial vehicle is transmitted by the camera units 5 to an external remote control device 4 for preparations, and at night, a heat sensing system is used to observe the low-altitude unmanned aerial vehicle. Further, the appearance of a drone detected by the camera units 5 and information of the low-altitude unmanned aerial vehicle which is obtained for a database by the sound detectors are analyzed to check the model of the low-altitude unmanned aerial vehicle in such a manner as to perform jamming and spoofing that are appropriate interceptor means.

As jamming means, there are a jammer 60, a jamming gun 70, and the like. In the case of jamming, a drone is monitored and detected by the radar 1 and the low-altitude unmanned aerial vehicle is identified by the image from the camera. Then, a disturbance signal is emitted to the low-altitude unmanned aerial vehicle so that approach of the low-altitude unmanned aerial vehicle is prevented in advance without physically intercepting or shooting down the low-altitude unmanned aerial vehicle. When the signal between the low-altitude unmanned aerial vehicle and the operator is lost, it is programmed to return to the starting point of the low-altitude unmanned aerial vehicle or to hover in the place, so effective defense is possible. Therefore, in some cases, it may be required to physically hit the hovering low-altitude unmanned aerial vehicle.

In the present disclosure, the jammer 60 and the jamming gun 70 are disclosed as jamming means, and the structure will be described in detail later.

As the interceptor means of the low-altitude unmanned aerial vehicle, there is spoofing in addition to jamming. There is a common point in that a drone is monitored and detected by the radar 1 and the low-altitude unmanned aerial vehicle is identified by the image from the camera, then approach of the low-altitude unmanned aerial vehicle is prevented in advance without intercepting or shooting down the low-altitude unmanned aerial vehicle. However, in the case of spoofing, a signal in the same type as the GPS signal is generated in such a manner that a GPS receiver recognizes an arbitrary position which is different from the actual position so that the low-altitude unmanned aerial vehicle is deceived to be positioned elsewhere.

In addition to such jamming and spoofing, physically hitting at close distance may be performed for defence against the low-altitude unmanned aerial vehicle. There are also interception using a laser beam, a countermeasure method using a capture net, a capturing method using an eagle, and a method of using a police drone. However, in the case of the capture net, there is a disadvantage that a response-available distance is short and it is difficult to cope with a large number of low-altitude unmanned aerial vehicles. When using the capture net, a method using a bazooka is used to discharge the capture net. It is common that the drone is restrained simply by the capture net and also information on the low-altitude unmanned aerial vehicle and information on the control stick are obtained through safe landing of the low-altitude unmanned aerial vehicle with a parachute device.

FIG. 2 is a perspective view illustrating a balloon main body 10 in a low-altitude unmanned aerial vehicle surveillance system according to an embodiment of the disclosure.

As shown in FIG. 2, a low-altitude unmanned aerial vehicle surveillance system according to an embodiment of the disclosure includes: a balloon main body 10 filled with gas and staying in the air; a rope connected to the balloon main body 10 and fixed to the ground; radar 1 provided on an outer upper portion of the balloon main body; a camera unit 5 being provided outside the balloon main body 10, and including a camera taking an image of a subject; an image transmission part and a heat sensing device included in the camera unit 5, and mounted to the balloon main body 10 to transmit an image; and an external remote control device 4 including a monitor receiving an image signal transmitted from the image transmission part for display, and a data storage part storing the image signal. The camera unit 5 includes: multiple cameras provided on the middle of the outer circumferential surface of the balloon main body 10; a signal transmitting part connected to the camera; and an adjusting part adjusting the angle of the camera. The camera units is provided with a position tracking device to take an image of a target while tracking the movement of the target. Thus, the camera can track a subject, that is, an unidentified aircraft while automatically or manually adjust the imaging angle, and it is possible to take an image thereof while tracking the aircraft.

The sound detector 7 is placed between the camera units and surrounds the outer middle of the balloon main body. Further, the radio frequency sensor 3 is placed on the upper portion of the sound detector 7 and surrounds the outer middle of the balloon main body. The system comprises at least one sound detector and radio frequency sensor, preferably a plurality of sound detectors and radio frequency sensors.

The external remote control device 4 includes a control part to enable remote controlling of the camera units. The control part helps to analyze the model of the target by keeping on tracking the target's path using a computer.

The balloon main body 10 is provided at upper and lower portions thereof with plates, and a front end of the rope is fastened to the lower plate.

The rope is configured such that a first end thereof is connected to a mount fixedly provided on the ground and a second end thereof is fixed to the lower plate of the balloon main body 10 so as to prevent the balloon main body 10 from rising any further and to control the same to float at a constant height.

On the upper portion of the balloon main body 10, the jamming gun, the jammer 60, or the GPS spoofing device 80 engages. Here, the jamming gun is also configured in such a manner as to possibly control the angle. In the case of the jammer 60 and the GPS spoofing device 80, a control module 67 is included.

A transport vehicle is provided to load the balloon main body 10 and transport the same to a desired location. The transport vehicle is preferably a wing body truck equipped with a large-capacity cargo box and vibration-free system capable of stable running. The transport vehicle is provided with a gas injection device configured to fill the inside of the balloon main body 10 with gas to provide buoyancy.

Accordingly, the balloon main body 10 is placed at the installation site and the gas is injected to the balloon main body to deploy the same.

The lower portion of the balloon main body 10 is connected to the rope and fastened to the mount provided on the ground. Since the rope is wound on a drum, the balloon main body 10 is lifted and pulls the rope, so that the drum is rotated and the wound rope is released to maintain its length.

A drive part is connected to the drum that winds the rope therearound. The actuation of the drive part allows the balloon main body 10 to be moved down by exerting a rotational force to wind the rope back around the drum.

The balloon main body 10 can be moved down to the ground to repair faults and add other necessary equipment.

The balloon main body 10 is in a balloon shape with heated air or gas filled therein, and is provided with a through-hole to be formed in a donut shape such that wind passes therethrough, wherein a wind power generator is provided in the through-hole. The wind power generator includes: a wind turbine; a generator generating electricity by receiving torque of the wind turbine; and a power storage part storing the generated electricity. Accordingly, the balloon main body can stay in the air for a long time by producing and using electric power to operate various types of equipment provided in the main body. To perform a long-term mission, it is more efficient to use a method of power supply through a mooring cable from the ground rather than a battery. However, in this case, it is difficult to operate in a remote area where electric power supply is limited, and it takes a long time to install electric power supply facilities, which lowers the responsiveness. To improve this, the balloon main body is provided with the wind power generator. Airborne Wind Energy can achieve high power generation efficiency by utilizing high quality wind resources at an altitude of 500 m or more. The power generation method is to operate the wind turbine in the air to obtain high efficiency. The balloon main body is fixedly operated at an altitude of 1 to 2 km from the ground for the detection of low-altitude unmanned aerial vehicles (UAVs), thus allowing the application of Airborne Wind Energy. This reduces the cost of building a power supply infrastructure and enables rapid deployment.

Further, the balloon main body 10 is made of a synthetic resin material having durability so as not to be damaged by sunlight and wind speed while being deployed in the air by being injected with heated air or gas.

FIG. 3 is a perspective view illustrating in detail a jamming gun 70 of a balloon main body 10 in a low-altitude unmanned aerial vehicle surveillance system according to an embodiment of the present invention.

As shown in FIG. 3, according to an embodiment of the disclosure, there is provided a jamming gun 70 including: an engaging part 71 for engaging with the upper portion of the balloon main body 10; a rotating part 73 being attached to the engaging part 71 and rotating upward, downward, leftward, and rightward; a jamming radio wave generation part 75 receiving power to generate radio waves; a jamming radio wave discharge part 77 connected to the jamming radio wave generation part 75 to generate the jamming radio waves and integrated with a directional antenna; and a cable 79 connecting the jamming radio wave generation part 75 and the jamming radio wave discharge part.

The jamming radio wave discharge part 77 is configured to discharge the received jamming radio waves to a target to be shot down, and is configured to be integrated with the jamming radio wave generation part 75.

FIG. 4 is a perspective view illustrating in detail a jammer 60 of a balloon main body 10 in a low-altitude unmanned aerial vehicle surveillance system according to an embodiment.

As shown in FIG. 4, the jammer 60 serving as aircraft interceptor means according to an embodiment of the disclosure includes, in the balloon main body 10 in order to disturb a wireless control signal of an aircraft, a GPS signal, and a gyro sensor: a GPS disturbance radio wave transmitter 61; a first disturbance radio wave transmitter 63a and a second disturbance radio wave transmitter 63b for disturbing a wireless control signal of the aircraft; a gyro sensor disturbance noise generator 65 for disturbing a gyro sensor; and a control module 67 for control in such a manner as to selectively emit only a disturbance signal that the user desires.

As a control signal of the low-altitude unmanned aerial vehicle, 2.5 GHz or 5.8 GHz is used, and in order to disturb these wireless signals, two disturbance radio wave transmitters, the first disturbance radio wave transmitter 63a and the second disturbance radio wave transmitter 63b, are required. Preferably, the first disturbance radio wave transmitter transmits radio waves of 2.5 GHz, and the second disturbance radio wave transmitter transmits radio waves of 5.8 GHz that is higher than the radio waves generated in the first disturbance radio wave transmitter. Further, in order to disturb a GPS signal of the low-altitude unmanned aerial vehicle, the GPS disturbance radio wave transmitter 61 is required. Each disturbance radio wave transmitter emits a stronger frequency than the actual signal so as to cause the low-altitude unmanned aerial vehicle to fly to other areas. The disturbance noise generator strongly emits the frequency near a resonant frequency of the gyro sensor to induce malfunction of the gyro sensor. Here, resonant frequency setting of the gyro sensor is set in comparison with a database through the camera unit 5 and the sound detector 7.

The GPS disturbance radio wave transmitter 61 is formed as a common GPS signal transmitter. The first disturbance radio wave transmitter 63a and the second disturbance radio wave transmitter 63b are formed as common R/C controllers that transmit a wireless control signal in a frequency band of 2.4 GHz or 5.8 GHz in order to control a drone wirelessly.

FIG. 5 is a perspective view illustrating in detail "a GPS spoofing device 80" of a balloon main body 10 in a low-altitude unmanned aerial vehicle surveillance system according to an embodiment.

As shown in FIG. 5, the GPS spoofing device 80 according to an embodiment of the disclosure includes: a mounting 81 engaged with the balloon main body 10; a GPS signal receiving part 82 engaged with the mounting 81; a synchronization signal generator 84 generating a signal synchronized with a GPS signal received from a satellite; a trigger generator 86 generating a trigger signal for generating a deception signal that is synchronized with a synchronization signal output from the synchronization signal generator 84; a deception signal generator 88 generating the deception signal for deceiving the GPS receiver which is a deception target, in response to the trigger signal; a control module 89 transmitting various types of commands or data required for drive; and a deception signal transmitting part 87 transmitting a signal generated by the deception signal generator 88.

The GPS spoofing device 80 according to the present invention generates the deception signal to deceive the GPS receiver which is the deception target in such a manner that a global navigation satellite system (GLASS) computes an arbitrary position differing from the actual position and time information. The GPS signal receiving part 82 receives a GPS signal from a single or multiple satellites through an antenna. The GPS signal receiving part 82 assigns the received GPS signal to the synchronization signal generator 84.

The synchronization signal generator 84 generates, on the basis of a navigation signal assigned through the GPS signal receiving part 82, a pulse per second (1 PPS) signal visually synchronized with the navigation signal. Here, the PPS signal means a signal in which a pulse repeats once per second.

The synchronization signal generator 84 uses a phase-locked loop to combine a frequency signal through an oscillator, such as an oven-controlled crystal oscillator (OCXO) or a rubidium oscillator, which has high frequency stability with the GPS signal received through the GPS signal receiving part 82, and outputs a 1PPS signal synchronized with the GPS signal through comparison-tracking on the phase of each signal.

Further, the synchronization signal generator 84 generates, in addition to the 1PPS signal visually synchronized with the GPS signal, a clock signal corresponding to a reference frequency of the GPS signal. This is utilized to generate a deception signal in which the GPS signal is synchronized with the clock frequency, and the synchronization signal generator 84 may generate a clock signal of 10 MHz considering that the clock frequency of the GPS signal has an integral-multiple relationship with about 10 MHz, which is the reference frequency.

As described above, the synchronization signal generator for generating the clock signal and the 1PPS signal synchronized with the navigation signal may be implemented utilizing a GPS disciplined oscillator (GPSDO).

The trigger generator 86 generates a trigger signal for generating the deception signal that is synchronized with the GPS signal on the basis of the 1PPS signal output from the synchronization signal generator 84.

The control module 89 corresponds to a control part that controls the operation of the trigger generator in response to reception of the GPS signal or user input through a user interface part.

FIG. 6 is a flowchart illustrating operation of a low-altitude unmanned aerial vehicle surveillance system according to an embodiment.

The low altitude monitoring system (LAW system) according to an embodiment is placed and operated in a required operation area at step S100.

Radar signals, radio frequency signals, sound signals in the monitoring airspace, an operation area, are collected at step S110.

Then, it is determined whether an abnormal signal other than the no-signal state or natural noise is detected or not at step S120.

The sound and optical sensors (EO/IIR) are operated to acquire target image information within the detection distance (close range) at step S130.

The sound and shape information of the target acquired through the detection sensor is transmitted to the ground-based big data system at step S140.

The ground-based big data system receives the sound and shape information at step S150.

It is determined in real time whether or not the information matches the existing data at step S160.

When the target is neither a friendly target nor a worthless target according to the data analysis result, it is determined whether or not the target is the hostile target at step S170.

When the hostile target is assured, data is transmitted to the interception center and is processed at step S180.

After the interception is decided, jamming, spoofing, or physical interception that are the interceptor means suitable for the target is selected, and the interception is executed at step S200.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. An aerial vehicle surveillance system comprising:
a balloon main body configured to be filled with gas;
a radar provided on an outer upper portion of the balloon main body;
camera units surrounding the balloon main body at predetermined intervals on an outer middle portion of the balloon main body, each of the camera units including a camera configured to take an image, an image transmission part configured to transmit the image, a position tracking device configured to track an aircraft while photographing, and a heat sensing device for night photographing;
sound detectors placed between the camera units, the sound detectors surrounding the outer middle portion of the balloon main body; and radio communication sensors provided on an upper portion of the sound detectors;

wherein the balloon main body comprises:

a first disturbance radio wave transmitter configured to transmit a first disturbance signal having a first frequency to disturb a wireless control signal of the aircraft;

a second disturbance radio wave transmitter configured to transmit a second disturbance signal having a second frequency to disturb the wireless control signal of the aircraft, the second frequency being different from the first frequency; and a jammer including a control module configured to selectively emit, as desired by a user, one of the first disturbance signal or the second disturbance signal.

2. The system of claim 1, wherein the second frequency is higher than the first frequency.

3. The system of claim 2, wherein the balloon main body further comprises:

a GPS disturbance radio wave transmitter configured to disturb a GPS signal of the aircraft.

4. The system of claim 2, wherein the balloon main body further comprises:

a gyro sensor disturbance noise generator configured to disturb a gyro sensor.

5. The system of claim 3, wherein the balloon main body further comprises:

a gyro sensor disturbance noise generator configured to disturb a gyro sensor.

6. An aerial vehicle surveillance system comprising:

a balloon main body configured to be filled with gas;

a radar provided on an outer upper portion of the balloon main body;

camera units surrounding the balloon main body at predetermined intervals on an outer middle portion of the balloon main body, each of the camera units including a camera configured to take an image, an image transmission part configured to transmit the image, a position tracking device configured to track an aircraft while photographing, and a heat sensing device for night photographing;

sound detectors placed between the camera units, the sound detectors surrounding the outer middle portion of the balloon main body; and radio communication sensors provided on an upper portion of the sound detectors;

wherein the balloon main body comprises a jamming gun including:

an engaging part configured to engage with the balloon main body;

a rotating part configured to attach to the engaging part and rotating upward, downward, leftward, and rightward;

a jamming radio wave generation part configured to generate a jamming radio wave by receiving power;

a jamming radio wave discharge part configured to connect to the jamming radio wave generation part to generate the jamming radio wave, and integrated with a directional antenna; and a cable configured to connect the jamming radio wave generation part and the jamming radio wave discharge part.

7. The system of claim 1, wherein the balloon main body further comprises a jamming gun including:

an engaging part configured to engage with the balloon main body;

a rotating part configured to attach to the engaging part and rotating upward, downward, leftward, and rightward;

a jamming radio wave generation part configured to generate a jamming radio wave by receiving power;

a jamming radio wave discharge part configured to connect to the jamming radio wave generation part to generate the jamming radio wave, and integrated with a directional antenna; and a cable configured to connect the jamming radio wave generation part and the jamming radio wave discharge part.

8. The system of claim 4, wherein the balloon main body further comprises a jamming gun including:

an engaging part configured to engage with the balloon main body;

a rotating part configured to attach to the engaging part and rotating upward, downward, leftward, and rightward;

a jamming radio wave generation part configured to generate a jamming radio wave by receiving power;

a jamming radio wave discharge part configured to connect to the jamming radio wave generation part to generate the jamming radio wave, and integrated with a directional antenna; and a cable configured to connect the jamming radio wave generation part and the jamming radio wave discharge part.

9. The system of claim 5, wherein the balloon main body further comprises a jamming gun including:

an engaging part configured to engage with the balloon main body;

a rotating part configured to attach to the engaging part and rotating upward, downward, leftward, and rightward;

a jamming radio wave generation part configured to generate a jamming radio wave by receiving power;

a jamming radio wave discharge part configured to connect to the jamming radio wave generation part to generate the jamming radio wave, and integrated with a directional antenna; and a cable configured to connect the jamming radio wave generation part and the jamming radio wave discharge part.

10. The system of claim 6, wherein the balloon main body further comprises a GPS spoofing device including:

a mounting configured to engage with the balloon main body;

a GPS signal receiving part configured to engage with the mounting;

a synchronization signal generator configured to generate a signal synchronized with a GPS signal received from a satellite;

a trigger generator configured to generate a trigger signal for generating a deception signal that is synchronized with a synchronization signal output from the synchronization signal generator;

a deception signal generator configured to generate a deception signal for deceiving a GPS receiver which is a deception target, in response to the trigger signal;

a control module configured to transmit various types of commands or data required for drive; and a deception signal transmitting part configured to transmit a signal generated by the deception signal generator.

11. The system of claim 7, wherein the balloon main body further comprises a GPS spoofing device including:

a mounting configured to engage with the balloon main body;
a GPS signal receiving part configured to engage with the mounting;
a synchronization signal generator configured to generate a signal synchronized with a GPS signal received from a satellite;
a trigger generator configured to generate a trigger signal for generating a deception signal that is synchronized with a synchronization signal output from the synchronization signal generator;
a deception signal generator configured to generate a deception signal for deceiving a GPS receiver which is a deception target, in response to the trigger signal;
a control module configured to transmit various types of commands or data required for drive; and
a deception signal transmitting part configured to transmit a signal generated by the deception signal generator.

12. The system of claim 8, wherein the balloon main body further comprises a GPS spoofing device including:
a mounting configured to engage with the balloon main body;
a GPS signal receiving part configured to engage with the mounting;
a synchronization signal generator configured to generate a signal synchronized with a GPS signal received from a satellite;
a trigger generator configured to generate a trigger signal for generating a deception signal that is synchronized with a synchronization signal output from the synchronization signal generator;
a deception signal generator configured to generate a deception signal for deceiving a GPS receiver which is a deception target, in response to the trigger signal;
a control module configured to transmit various types of commands or data required for drive; and
a deception signal transmitting part configured to transmit a signal generated by the deception signal generator.

13. The system of claim 9, wherein the balloon main body further comprises a GPS spoofing device including:
a mounting configured to engage with the balloon main body;
a GPS signal receiving part configured to engage with the mounting;
a synchronization signal generator configured to generate a signal synchronized with a GPS signal received from a satellite;
a trigger generator configured to generate a trigger signal for generating a deception signal that is synchronized with a synchronization signal output from the synchronization signal generator;
a deception signal generator configured to generate a deception signal for deceiving a GPS receiver which is a deception target, in response to the trigger signal;
a control module configured to transmit various types of commands or data required for drive; and
a deception signal transmitting part configured to transmit a signal generated by the deception signal generator.

\* \* \* \* \*